United States Patent
Bassirat

[19]

[11] Patent Number: 6,122,513
[45] Date of Patent: *Sep. 19, 2000

[54] METHOD FOR EXTENDING HARD-HANDOFF BOUNDARIES WITHIN A MOBILE TELEPHONE COMMUNICATIONS NETWORK

[75] Inventor: Farhad Bassirat, Plano, Tex.

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/965,279

[22] Filed: Nov. 6, 1997

[51] Int. Cl.$^7$ ........................................... H04Q 7/20
[52] U.S. Cl. ........................................... 455/443; 455/439
[58] Field of Search ................... 455/436, 438, 455/439, 440, 443, 444, 447, 449, 453, 502, 503, 7, 16, 15, 20, 11.1, 446, 450, 448, 452

[56] References Cited

U.S. PATENT DOCUMENTS

| | | | |
|---|---|---|---|
| 4,479,245 | 10/1984 | Batlivala et al. | 455/18 |
| 4,727,590 | 2/1988 | Kawano et al. | 455/446 |
| 5,152,002 | 9/1992 | Leslie et al. | 455/422 |
| 5,179,559 | 1/1993 | Crisler et al. | 370/332 |
| 5,218,715 | 6/1993 | Leslie et al. | 455/15 |
| 5,260,943 | 11/1993 | Comroe et al. | 370/332 |
| 5,408,679 | 4/1995 | Masuda | 455/11.1 |
| 5,541,979 | 7/1996 | Leslie et al. | 455/436 |
| 5,548,803 | 8/1996 | Evans | 455/16 |
| 5,561,845 | 10/1996 | Bendixen et al. | 455/443 |
| 5,615,215 | 3/1997 | Utting et al. | 370/337 |
| 5,649,000 | 7/1997 | Lee et al. | 455/436 |
| 5,708,969 | 1/1998 | Kotzin et al. | 455/34.2 |
| 5,761,623 | 6/1998 | Lupien et al. | 455/552 |
| 5,848,063 | 12/1998 | Weaver, Jr. et al. | 370/331 |
| 5,883,884 | 3/1999 | Atkinson | 370/279 |
| 5,913,169 | 6/1999 | Vaara | 455/443 |
| 5,920,819 | 7/1999 | Asanuma | 455/447 |
| 5,940,761 | 8/1999 | Tiedemann, Jr. et al. | 455/437 |
| 5,991,628 | 11/1999 | Pedziwiatr et al. | 455/443 |

*Primary Examiner*—Nguyen Vo
*Assistant Examiner*—Charles N. Appiah
*Attorney, Agent, or Firm*—John D. Crane; Felsman, Bradley, Vaden, Gunter & Dillon, LLP

[57] ABSTRACT

A method for extending hard-handoff boundaries within a mobile telephone communications network is disclosed. There are multiple cells within a CDMA cellular/PCS telephone communications network, in which some of the cells operate under two separate carrier frequencies. In order to extend the hard-handoff boundary of a boundary cell that operates under two carrier frequencies, a neighboring cell adjacent to the boundary cell but operating under only one of the two carrier frequencies of the boundary cell must first be located. Then, a repeater with a fixed or adjustable delay is placed between the boundary cell and the neighboring cell such that the hard-handoff boundary of the boundary cell is extended.

18 Claims, 7 Drawing Sheets

METHOD FOR EXTENDING HARD-HANDOFF BOUNDARIES WITHIN A MOBILE TELEPHONE COMMUNICATIONS NETWORK

BACKGROUND OF THE INVENTION

1. Technical Field

The present invention relates to a method for servicing a wireless communications network in general, and in particular to a method for servicing a CDMA cellular/PCS telephone communications network. Still more particularly, the present invention relates to a method for extending hard-handoff boundaries of a boundary cell within a cellular/PCS telephone communications network.

2. Description of the Prior Art

For some code-division multiplex access (CDMA) cellular/Personal Communication Service (PCS) telephone communications networks, a single channel frequency is typically sufficient to provide service over the entire service area. However, in areas where the need for service is high, two or more channel frequencies are required to meet the demands. Within a dual channel frequency service area, if the second channel frequency is also covering the entire service area, theoretically a CDMA mobile can remain on one of the two channel frequencies while it is being moved anywhere within the service area. But this may not be true in practice because the second channel frequency is intended for handling heavy traffic areas such that the mobile has to switch its channel frequency while it is being moved across certain designated boundaries. The process of a CDMA mobile breaking from one base station, switching to a new channel frequency, and establishing a link with a new base station is known as a "hard-handoff."

There are typically two hard-handoff situations when a CDMA mobile operating at frequency $f_1$ needs to be handed off to another frequency $f_2$. The first situation is a "same-cell situation" in which the first carrier frequency $f_1$ is ubiquitous within a coverage area while the second carrier frequency $f_2$ is deployed to cover a limited area (such as a heavy traffic area) within the coverage area of first carrier frequency $f_1$. The second situation occurs at the boundaries between two coverage areas, each area being separately covered by carrier frequencies $f_1$ and $f_2$. In the former case, the service provider is the same, while in the latter case the service provider can be either the same or different.

Figure 1:
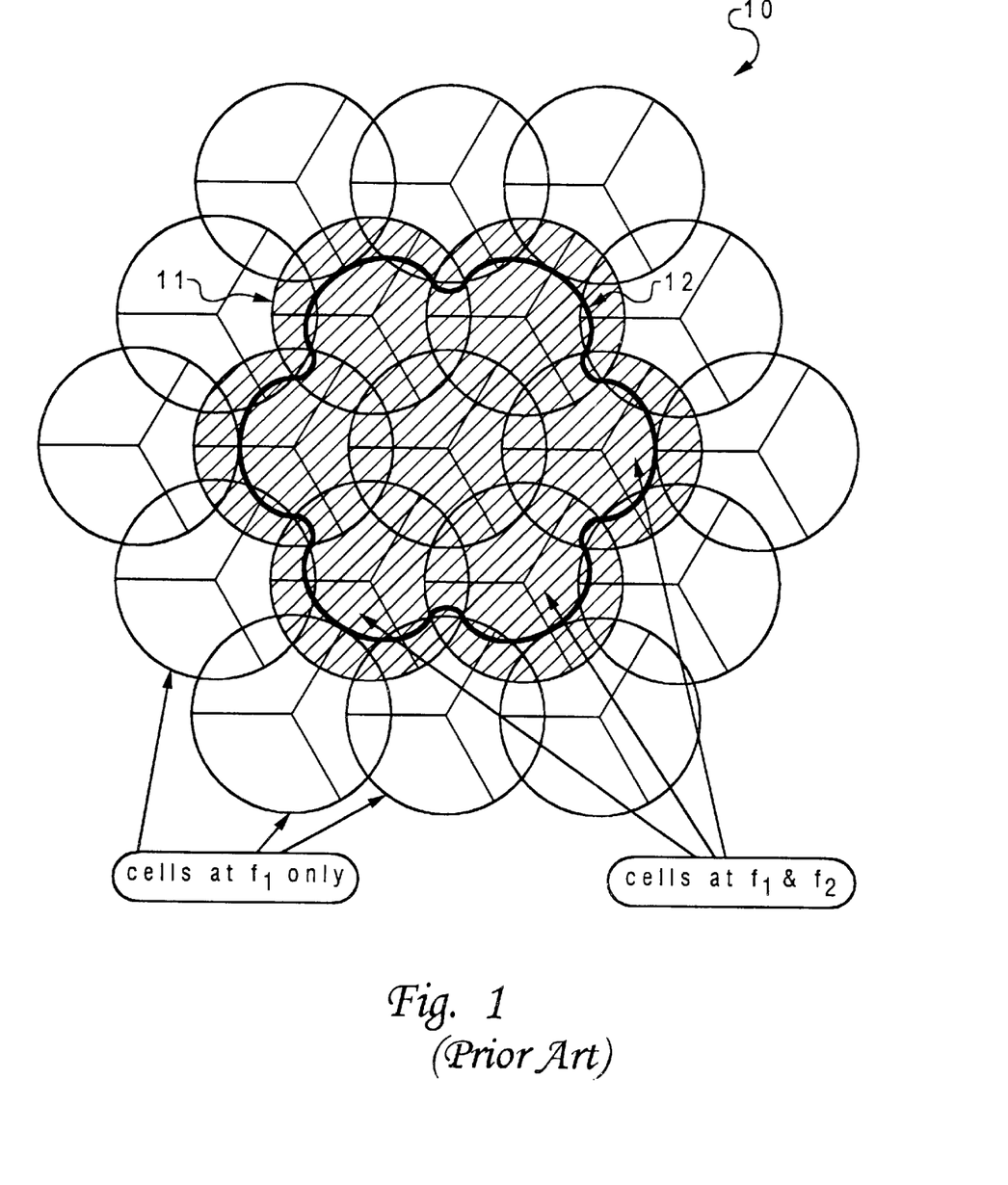
FIG. 1 is a same-cell situation in which a second carrier is deployed in a limited number of cells within a coverage area of a first carrier.

Referring now to the drawings and in particular to FIG. 1, there is illustrated a same-cell situation in which a second carrier is deployed in a limited number of cells within a coverage area of a first carrier. Assume that $f_1$ is the first carrier frequency utilized throughout an entire coverage area 10 and that $f_2$ is the second carrier frequency utilized to cover only a small number of cells within a heavy traffic region 11 (shown as shaded area in FIG. 1) of coverage area 10. There are three conditions that must be established in order to trigger a hard-handoff process: (1) the cellular telephone must be in an $f_2$ boundary cell, i.e., a cell beyond which no service will be provided at frequency $f_2$; (2) the mobile reports that all non-boundary sector pilot powers have fallen below a T-drop (a set value below which the mobile will drop the link to that cell); and (3) Round Trip Delay (RTD), i.e., a method of measuring the distance between the mobile and the base station, must be greater than a predetermined value.

If a CDMA mobile is near a cell boundary, then it is ready to be switched from frequency $f_2$ to frequency $f_1$. A RTD measurement is typically utilized to locate the position of the CDMA mobile, and such information can be further utilized to determine whether or not it is near a cell boundary. However, RTD measurements are usually not very accurate in terms of locating the exact position of the CDMA mobile. Several conditions may limit the accuracy of RTD measurements. For example, a selector begins to receive a RTD report only after the RTD of the mobile has changed by at least two chips. This translates to an error of approximately 244 meters in establishing the exact location of the mobile. Further, the hard-handoff process may take up to five seconds. Now if the mobile is being moved at a speed of 70 m.p.h., then the mobile will have travelled at least 156 meters from the moment the hard-handoff process was initiated until the process is completed. Adding that to the RTD uncertainty (i.e., 244 meters), the mobile is almost 400 meters away from the cell boundary when the hard-handoff process is triggered. Because this $f_2$ cell is a boundary cell, there is no soft-handoff gain for a cellular telephone that is going to switch to frequency $f_1$, which results in a higher forward link $E_b/N_o$ (energy/noise) requirement. This number has been estimated to be approximately 5 dB, which means that the reception level at the boundary cell is roughly 5 dB lower than the neighboring cells. In fact, the cells utilized in heavy urban areas are generally small already (typically around 1 kilometer); by shrinking $f_2$ cells 5 dB in order to allow for the high $E_b/N_o$ requirement, the $f_2$ cells will be even smaller. As a result, the requirements of 400-meter distance from the cell edge and a 5 dB cell shrinkage may cause problems for cells in heavy traffic urban areas. This "shrunk" hard-handoff boundary 12 as shown in FIG. 1 indicates a significant reduction in the coverage area of the boundary cells.

Figure 2:
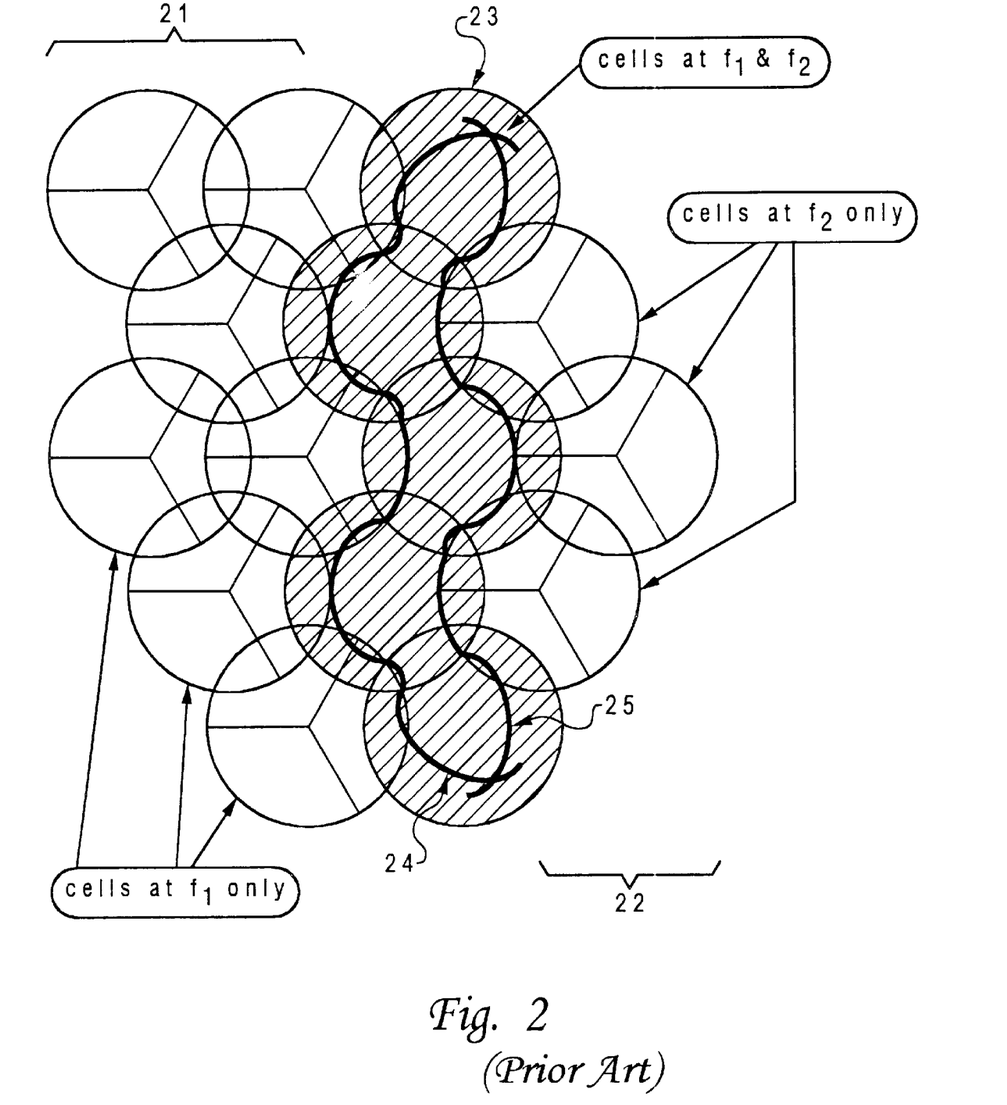
FIG. 2 is a situation in which two different carriers are respectively deployed in two separate coverage areas that are adjacent to each other within a CDMA cellular/PCS telephone communications network.

With reference now to FIG. 2, there is illustrated a situation in which two different carriers are respectively deployed in two separate coverage areas that are adjacent to each other within a CDMA cellular/PCS telephone communications network. Assume that $f_1$ is the carrier frequency for cells 21 on the left side and $f_2$ is the carrier frequency for cells 22 on the right side. In this situation, there are three conditions that must be established in order to trigger a hard-handoff process: (1) the mobile must be in a boundary cell, which is a bi-sector cell in which service is provided by both frequencies $f_1$ and $f_2$; (2) the mobile reports that all non-boundary sector pilot powers have fallen below a T-drop; and (3) RTD must be greater than a predetermined value. These three conditions are similar to those of the same-cell situation, but here, overlayered bi-sector cells 23 (shown as a shaded area in FIG. 2) are operating under both frequencies $f_1$ and $f_2$. Bi-sector cells 23 are required to eliminate any ambiguity in determining the correct frequency of operation for the CDMA mobile and the base station to which it is going to be handed off. Note that in this case the mobile will be handed off to a co-located base station (i.e., a bi-sectored base station). The issues in this situation are similar to those of the same-cell deployment situation. As a result, the cell boundaries on both sides shrink, due to high $E_b/N_o$ requirement, approximately 400 meters from the corresponding actual cell boundary. A "shrunk" hard-handoff boundary 24 indicates where the mobile switches from frequency $f_2$ to frequency $f_1$ and a "shrunk" hard-handoff boundary 25 indicates where the mobile switches from frequency $f_1$ to frequency $f_2$.

Consequently, it would be desirable to provide an improved method to extend the boundary of a boundary cell within a CDMA cellular/PCS telephone communications network such that the shrinkage in service area of a second carrier frequency can be reduced.

SUMMARY OF THE INVENTION

In view of the foregoing, it is therefore an object of the present invention to provide an improved method for servicing a CDMA cellular/PCS telephone communications network.

It is another object of the present invention to provide an improved method for servicing a CDMA cellular/PCS telephone communications network.

It is yet another object of the present invention to provide an improved method for extending hard-handoff boundaries of a boundary cell within a CDMA cellular/PCS telephone communications network.

In accordance with a preferred embodiment of the present invention, there are multiple cells within a cellular telephone communications network, in which some of the cells operate under two separate carrier frequencies. In order to extend the hard-handoff boundary of a boundary cell that operates under two carrier frequencies, a neighboring cell adjacent to the boundary cell but operating under only one of the two carrier frequencies of the boundary cell must first be located. Then, a repeater with a fixed or adjustable delay is placed between the boundary cell and the neighboring cell such that the hard-handoff boundary of the boundary cell is extended.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in any CDMA cellular/PCS telephone communications network. As will be understood by those skilled in the art, the present invention is applicable for both CDMA cellular/PCS base stations and cellular subscriber units.

Figure 3:
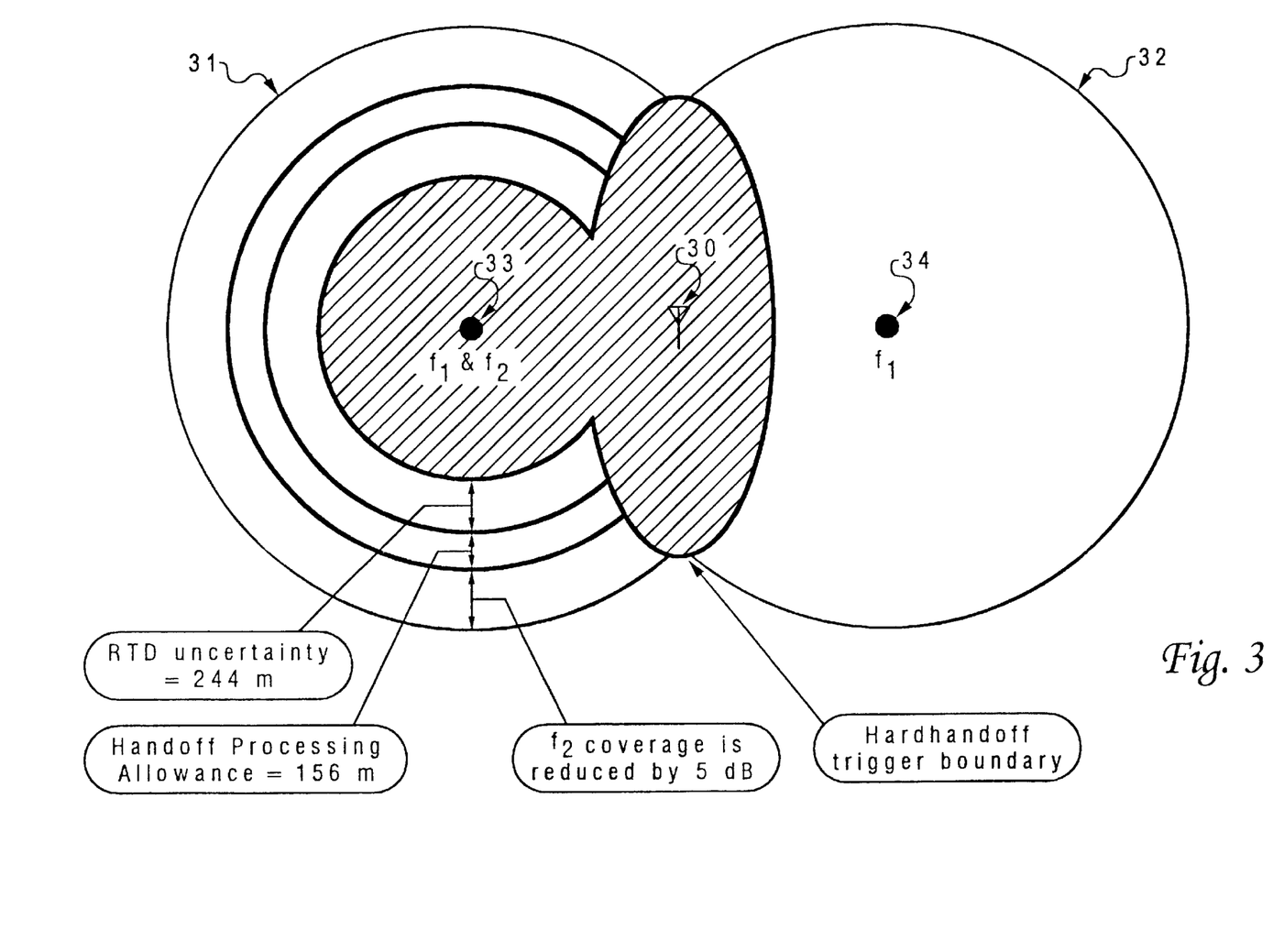
FIG. 3 illustrates a method for improving hard-handoff performance within a CDMA cellular/PCS telephone communications network, in accordance with a preferred embodiment of the present invention.

Referring now to FIG. 3, there is illustrated a method for extending hard-handoff boundaries of a boundary cell within a CDMA cellular/PCS telephone communications network, in accordance with a preferred embodiment of the present invention. As shown, a repeater 30 is deployed on one side of a cell 31 transmitting at both frequencies $f_1$ and $f_2$. Cell 31 borders another cell 32 transmitting at only frequency $f_1$. Repeater 30 delays any signal by a delay level $\tau_{rep}$ before it transmits back to a base station 33. This delay can also be added to a forward path of the communications network. In addition, this delay can be broken into two parts such that the first part will be added to a forward path of the communications network and the second part will be added to a reverse path of the communications network. The delay level can be adjusted according to the deployment requirements of cell 31. Base station 33 will then be able to measure the signal and the delay coming from repeater 30. Afterwards, base station 33 will trigger a hard-handoff when the following conditions apply:

(1) A mobile is in a boundary cell. A boundary cell is a cell beyond which no service is provided at that frequency. In FIG. 3, the boundary cell is cell 31 and there will be no service at frequency $f_2$ beyond cell 31.

(2) Base station 33 detects a usable multipath that has a delay greater than a predetermined value. In other words, RTD must be greater than a predetermined delay value of $\tau_{rep}$.

(3) Base station 33 measures the delayed signal as the strongest signal verses any other signal that it receives from the mobile.

(4) The mobile reports that all non-boundary sector pilot powers have fallen below a T-drop.

If conditions (2) and (3) above do not apply (such as when the mobile is in shadow with repeater 30), while conditions (1) and (4) still apply, and an RTD measurement for the mobile is greater than a predetermined value $\tau_{dir}$ but less than a value $\tau_{rep\text{-}set}$, then the base station assumes that the mobile is very close to its cell boundary while in shadow with repeater 30 (that is why it cannot see repeater 30), and triggers a hard-handoff to a co-located base station. If conditions (1)–(4) apply, then the mobile can be handed off to a neighboring cell.

Since repeater 30 intentionally adds a delay to a reverse path of the communications network, then the delay can be set to a value so that base station 33 can distinguish it from the direct-path signals. As shown in FIG. 3, repeater 30 works as a cell extender by extending the cell boundary of cell 31 (shown in shaded areas). Although there is still shrinkage from the edge of cell 31, now it is measured from the extended edge of cell 31 and not from the original cell edge. Repeater 30 also reduces the 5 dB penalty on the cell coverage area. Even though the $f_2$ boundary has been extended, there will not be any impact on the surrounding cells which operate at frequency $f_1$.

In the prior art, the hard-handoff procedure requires that the mobile handoff to a co-located base station, such as base station 33, in order to eliminate any ambiguity in determining the correct base station to which the cellular telephone must be handed off. By utilizing a repeater 30 as taught in the present invention, it is not necessary to handoff to co-located base station 33. The reason for this improvement is as follows. If the search window for base station 33 is 2 Walsh symbol or 416 $\mu$s wide, for example, this means that any delayed signal which is within this window can be detected by base station 33. But base station 33 cannot utilize any delay signal within its wide search window of 416 $\mu$s. Thus, base station 33 is limited to 1 Walsh symbol or 208 $\mu$s, which is still quite wide. This means that multipath signals which are less than 208 $\mu$s apart from each other can be successfully decoded and combined by base station 33. The wide search window and the ability to distinguish the multipath through repeater 30 means a mobile will be handed off to a neighboring cell after the mobile is located within the coverage area of the neighboring cell such that handoff to a co-located base station is not necessary.

There are certain economic benefits associated with handing off to a base station 34 in neighboring cell 32 instead of co-located based station 33. For example, in urban areas where two carriers are utilized, the first carrier will be loaded with users. If the handoff is to a co-located base station when the mobile is being moved from the second carrier to the first carrier, then the capacity of the co-located base station will be overloaded, especially when the co-located first carrier base station is deployed at a location in which there is heavy traffic. On the other hand, most of the mobiles that are hard-handoffed are going to move to a neighboring cell, where there is less demand. So it is better to hand the mobile off to a neighboring cell where there is less demand.

Figure 4:
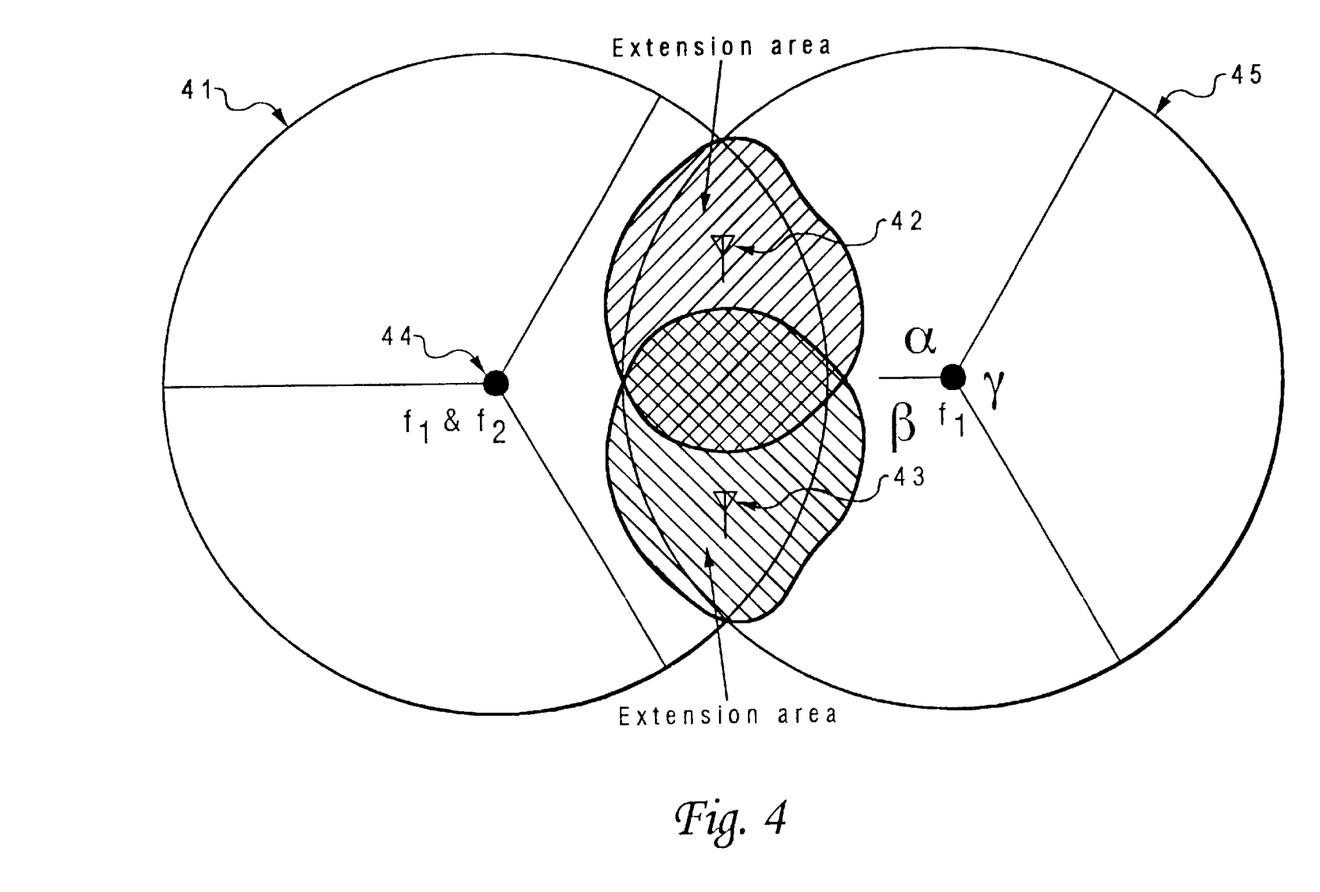
FIG. 4 illustrates a two-repeater arrangement between two cells, in accordance with a preferred embodiment of the present invention.

Although a single repeater 30 is shown in FIG. 3, the carrier frequency $f_2$ coverage can be extended in a number of directions as needed by the deployment of additional repeaters. For example, in heavy traffic areas such as downtown areas, the signal delays are within 5 to 10 $\mu$s. Since this delay is much smaller than the delay window (208 $\mu$s) of a base station, it is possible to utilize several repeaters, each having a specific level of delay. The base station can then detect each delayed signal and utilize it to locate the position of the mobile, as well as the repeater that the mobile is in communication with, and to find out the closest base station cell or sector that it can handoff the mobile to. An example of such a situation is shown in FIG. 4. As illustrated, there are two repeaters 42, 43 deployed near the edge of boundary cell 41. Repeaters 42 and 43 extend the $f_2$ cell boundary. If the mobile is in communication with the base station through repeater 42, then the mobile will be handed down to the $\alpha$ sector of a $f_1$ cell 45 on the right side. On the other hand, if the mobile is in communication with the base station though repeater 43, then the mobile will be handed down to the $\beta$ sector of $f_1$ cell 45. When the mobile is in communication through both repeaters 42, 43, then base station 44 will pick the strongest delayed signal and handoff the mobile to a sector of $f_1$ cell 45 that is closest to a repeater (with strongest delay). Note that the common boundary of two repeaters 42, 43 is on the common border of the a sector and the $\beta$ sector of $f_1$ cell 45.

Figure 5:
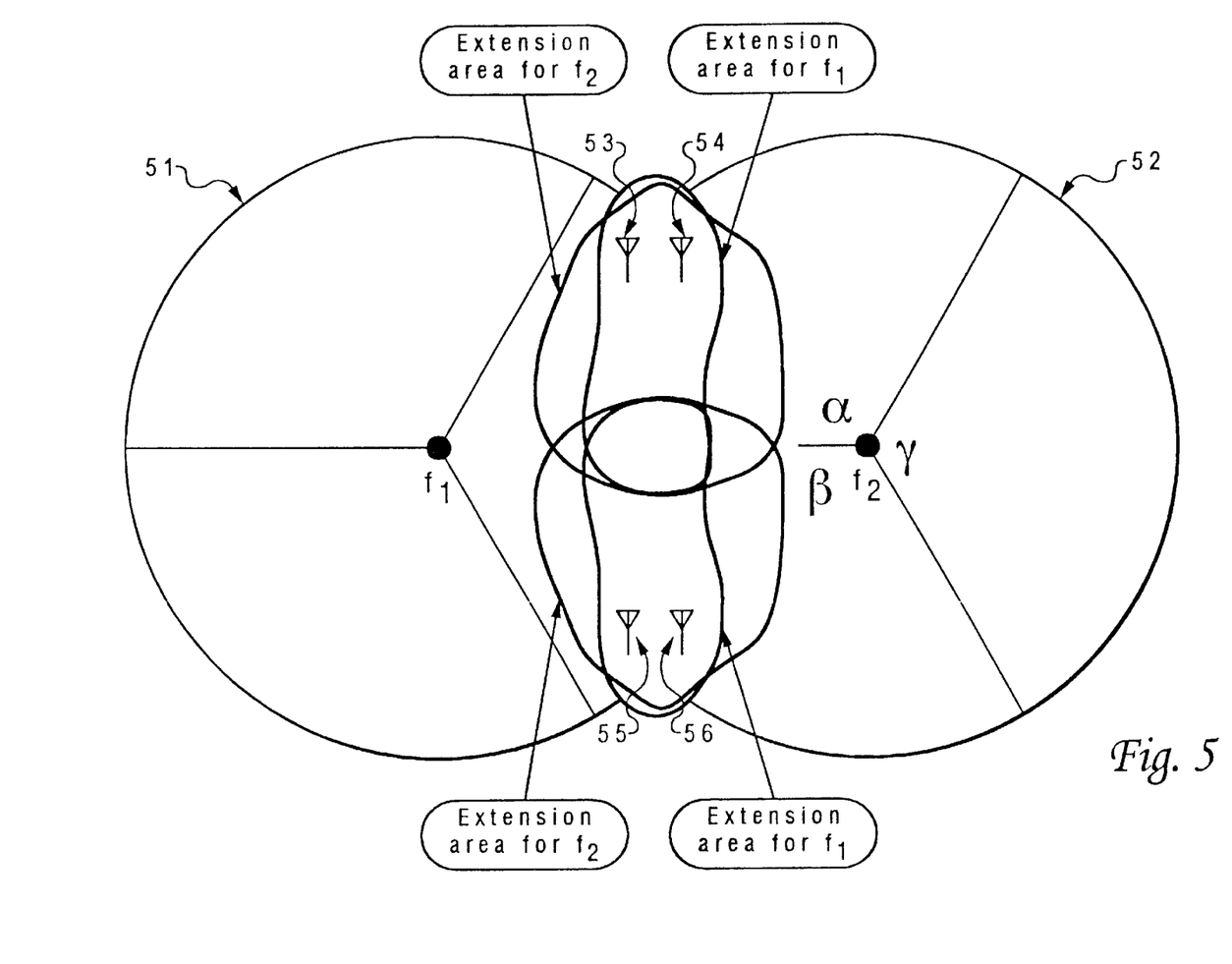
FIG. 5 illustrates a four-repeater arrangement between two cells, in accordance with a preferred embodiment of the present invention.

The requirement of deploying overlapped bi-sector cells operating at both frequencies $f_1$ and $f_2$ at inter-cell boundaries under the prior art deployment guidelines stated earlier can be eliminated by utilizing multiple repeaters. An illustration of a four-repeater deployment for handling the above situation is shown in FIG. 5. As depicted, cell 51 and cell 52 are adjacent to each other, each operating at different frequencies. Since the cell layout is such that the sectors are not properly aligned, a total of four repeaters 53–56 are needed (two per carrier). This will insure that the CDMA mobile will be handed off from $f_1$ cell 51 to the right sector of $f_2$ cell 52 ($\alpha$ or $\beta$ sector), and the CDMA mobile in the $\alpha$ sector or $\beta$ sector of $f_2$ will be handed off properly to $f_1$ cell 51.

Figure 6:
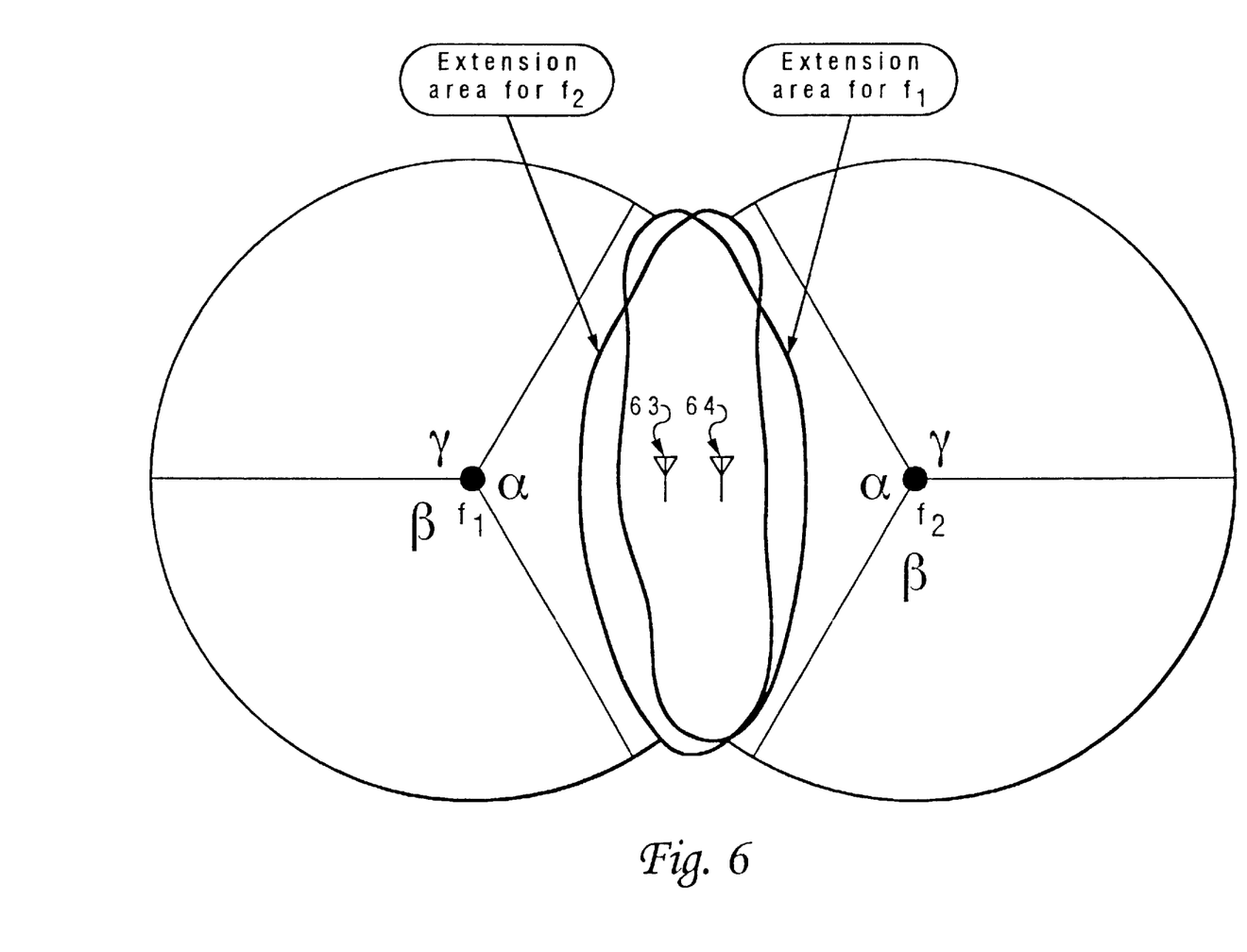
FIG. 6 illustrates a two-repeater arrangement between two aligned cells, in accordance with a preferred embodiment of the present invention.

However, if the two sectors of $f_1$ cell 51 and $f_2$ cell 52 are aligned properly or in an omni-cell deployment, then only two instead of four repeaters are required, as shown in FIG. 6. Since repeaters 63, 64 are deployed as cell extenders and there are only two different frequencies, a CDMA mobile will be handed off from one frequency to another without any problem. An important feature of this type of deployment is that now two base stations are eliminated (one at each frequency) and are replaced with repeaters 63, 64, which cost less than 5% of a base station. Furthermore, repeaters 63, 64 are approximately the size of a briefcase and can be mounted on a mast near the antennas themselves. With two base stations, a total of eight antennas (two per sector for each base station, each base station having 2 sectors in bi-sector deployment) are required. But with repeaters 63, 64, only six antennas are needed. Thus, there are enormous cost saving associated with the usage of repeaters as taught by the present invention.

Theoretically speaking, repeaters may be deployed at all cell boundaries, but this type of implementation is very expensive. Referring back to FIG. 1, there are seven cells at $f_2$ frequency, in which any mobile in one of the six boundary cells will be switched to frequency $f_1$ by a hard-handoff, if required. Quite clearly, boundary 12 indicates that the capacity of the base stations at $f_2$ cells are not fully utilized. If the full capacity of these base stations needs to be extended, then a total of 33 repeaters is required. Considering the number of antennas involved, this solution may not be economically viable.

But in fact, the minimum number of repeaters required depends on the demand for service. At certain $f_2$ boundaries where the demand for service is high, the service provider may opt to deploy repeaters to extend the coverage area, in order to fully utilize the maximum capability of the base station. Where the demand is low, the service provider may opt to utilize the prior art hard-handoff method with reduced coverage. This way, there is a balance between the cost to the service provider and the quality of service to the customer.

Similarly, while repeaters may theoretically be deployed for all two way hard-handoffs at a same-cell situation, in practice this may not be economically viable. As explained previously, 33 repeaters would be required to cover all hard-handoffs from frequency $f_2$ to frequency $f_1$ in the seven-cell layout of FIG. 1. In order to make the hard-handoff two ways, this number must be doubled. Hence, as a compromise, like the previous case, the hard-handoffs from frequency $f_1$ to frequency $f_2$ can be limited to a small number of locations where two-way traffic is high. The benefit is to balance the load on the communications network. One of the conditions where such a solution works is by managing the directions of communication traffic within the communications network during daytime. For example, because the communication traffic is generally heading towards downtown in the morning, what is required is to control certain cell corridors to handoff part of the communication traffic from frequency $f_1$ to frequency $f_2$. And because the opposite happens in the evening, what is required is to reverse the direction of the majority of the hard-handoffs from frequency $f_2$ to frequency $f_1$.

Figure 7:
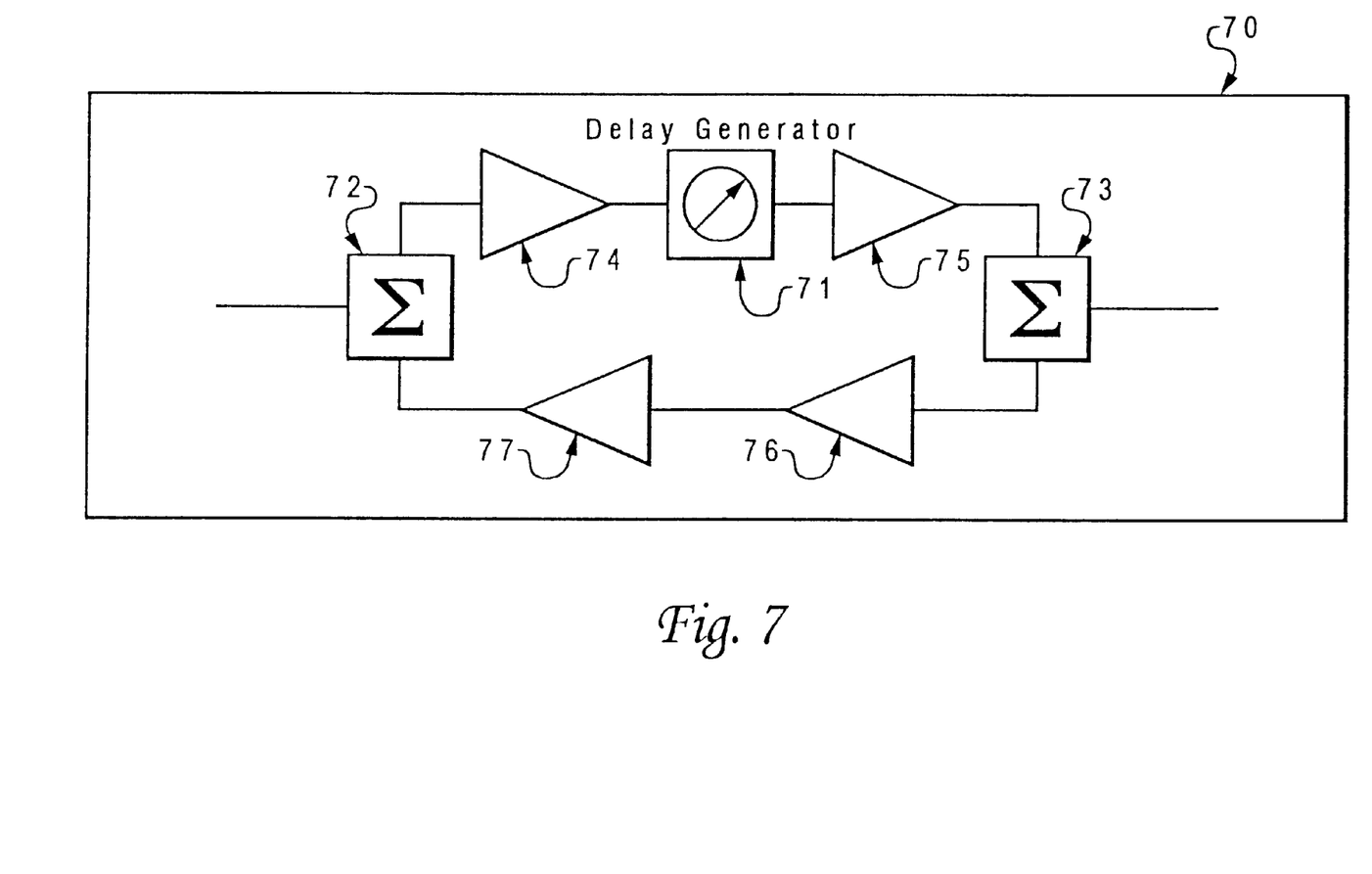
FIG. 7 is a block diagram of a repeater in accordance with a preferred embodiment of the present invention.

Referring now to FIG. 7, there is illustrated a block diagram of a repeater in accordance with a preferred embodiment of the present invention. As shown, repeater 70 includes a delay generator 71, two summation circuits 72, 73, and four filters 74–77. Delay generator 71 adds extra delay to its reverse link path. The delay is adjustable based on the requirements of the link as mentioned supra. It should be pointed out that repeater 70 shown in FIG. 7 is quite simplified. It is understood by those skilled in the art that some repeaters may also have inband filters and some may down-convert/up-convert the signal.

As has been described, the present invention provides an improved method for extending a coverage boundary of a boundary cell within a CDMA cellular/PCS communications network. According to the present invention, the usage of a repeater can extend a RTD coverage boundary of a second frequency carrier in a boundary cell operating under two frequency carriers. Another result that may be achieved by the present invention is that all the mobiles at the original cell edge will communicate to a base station at a much lower transmitting power.

While the invention has been particularly shown and described with reference to a preferred embodiment, it will be understood by those skilled in the art that various changes in form and detail may be made therein without departing from the spirit and scope of the invention.

What is claimed is:

1. A method for extending a hard-handoff boundary of a boundary cell within a mobile telephone communications network, said method comprising the steps of:

locating a neighboring cell adjacent to said boundary cell, wherein said boundary cell operates under a first carrier frequency and a second carrier frequency, wherein said neighboring cell operates under only one of said first and second carrier frequencies of said boundary cell; and placing a repeater within an overlapping signal coverage area of said boundary cell and said neighboring cell such that said hard-handoff boundary of said boundary cell is extended.

2. The method according claim 1, wherein said repeater adds a delay to a forward path of said mobile telephone communications network.

3. The method according to claim 1, wherein said repeater adds a delay to a reverse path of said mobile telephone communications network.

4. The method according to claim 1, wherein said repeater adds a delay to both a forward path and a reverse path of said mobile telephone communications network.

5. The method according to claim 4, wherein said delay is adjustable.

6. The method according to claim 1, wherein said method further includes a step of placing a plurality of repeaters within an overlapping signal coverage area of said boundary cell and said neighboring cell.

7. The method according to claim 6, wherein each of said plurality of repeaters provides a unique level of delay to a forward path of said mobile telephone communications network.

8. The method according to claim 6, wherein each of said plurality of repeaters provides a unique level of delay to a reverse path of said mobile telephone communications network.

9. The method according to claim 6, wherein each of said plurality of repeaters provides a unique level of delay to both a forward path and a reverse path of said mobile telephone communications network.

10. A mobile telephone communications network, comprising:

a boundary cell that operates under a first carrier frequency and a second carrier frequency;

a neighboring cell adjacent to said boundary cell, wherein said neighboring cell operates under only one of said first and second carrier frequencies of said boundary cell; and a repeater located within an overlapping signal coverage area of said boundary cell and said neighboring cell for extending a hard-handoff boundary of said boundary cell within said mobile telephone communications network.

11. The mobile telephone communications network according to claim 10, wherein said repeater includes a delay generator for adding a delay to a forward path of said mobile telephone communications network.

12. The mobile telephone communications network according to claim 10, wherein said repeater includes a delay generator for adding a delay to a reverse path of said mobile telephone communications network.

13. The mobile telephone communications network according to claim 10, wherein said repeater includes a delay generator for adding a delay to both a forward path and a reverse path of said mobile telephone communications network.

14. The mobile telephone communications network according to claim 13, wherein said delay is adjustable.

15. The mobile telephone communications network according to claim 10, wherein said mobile telephone communications network further includes a plurality of repeaters located within an overlapping signal coverage area of said boundary cell and said neighboring cell.

16. The mobile telephone communications network according to claim 15, wherein each of said plurality of repeaters provides a unique level of delay to a forward path of said mobile telephone communications network.

17. The mobile telephone communications network according to claim 15, wherein each of said plurality of repeaters provides a unique level of delay to a reverse path of said mobile telephone communications network.

18. The mobile telephone communications network according to claim 15, wherein each of said plurality of repeaters provides a unique level of delay to both a forward path and a reverse path of said mobile telephone communications network.

* * * * *